Patented Mar. 31, 1942

2,278,231

UNITED STATES PATENT OFFICE 2,278,231

MANUFACTURE OF PLASTICIZED POLYVINYL CHLORIDE FILAMENTS, SHEETS, ETC.

James G. E. Wright, Alplaus, N. Y., assignor to General Electric Company, a corporation of New York No Drawing. Application June 29, 1939, Serial No. 281,883

8 Claims. (Cl. 260—36)

The present invention relates to synthetic rubber-like articles of manufacture.

Plasticized polyvinyl halide compositions, such as plasticized polyvinyl chloride compositions, may be formed into filaments, sheets and hollow articles. This may be done by dissolving the polyvinyl chloride along with a suitable plasticizer, such as tricresyl phosphate, in a water miscible solvent, such as acetonyl acetone, and bringing the solution so obtained into contact with water. The water enters into the solvent and produces almost instantaneous coagulation of the plasticized polyvinyl chloride. The latter appears as a filament, if the solution has been forced through an orifice, or as a sheet if a narrow slot has been used, or as a coating on the inner surface of a vessel if a hollow body is being used in order to reproduce the contours of the vessel.

Two difficulties arise in the production of such articles. Too long a contact with the precipitating medium, that is water, results in non-transparent weak articles. Also, the surfaces of the articles so prepared have a tendency to be "tacky" and thus to adhere to each other.

In accordance with the present invention, the foregoing difficulties are obviated and articles produced which are transparent, strong and free from tacky surfaces.

It has been discovered that if certain substances be added to the plasticized polyvinyl halide composition, non-whitening, non-tacky, strong articles are produced. In the case of artificial filaments where extensibility and wet-strength are important factors, the additions produce such articles which are extensible to a great degree and possess great wet-strength.

The substances which have been found to impart these important properties to the articles manufactured are the organic silicates which are hydrolyzable but not easily so. Glycol silicate is not employed because upon contact with water it sets to a gel almost immediately indicating practically instantaneous and complete hydrolysis. On the other hand, the more difficultly hydrolyzable silicates, such as those in which the ester groups are derived from monohydric aliphatic alcohols, are adaptable. An ethyl silicate, such as tetraethyl silicate, is preferred from the standpoint of wet-strength and extensibility of the final product as well as rate of hydrolysis.

The organic silicates having a comparatively slow rate of hydrolysis, for example, the tetraethyl silicate, may be added to the polyvinyl halide composition in varying amounts. The properties of the product are improved by the addition of from 12 to 300 per cent by weight of the silicate based on the weight of polyvinyl halide used. The optimum effect of wet-strength and extensibility is reached when the ethyl silicate is present in about double the amount of the polyvinyl halide. Certain applications, however, may require a smaller proportion of the silicate in order that coagulation does not take place too rapidly for practical purposes when the composition is treated with water.

In order to indicate more clearly the advantageous results of the present invention, the following examples may be considered:

*Example A.*—A solution of eight parts by weight of polyvinyl chloride and four parts by weight of tricresyl phosphate in 88 parts by weight of acetonyl acetone may be prepared by dissolving the resin in the solvent at a temperature of 120° C. After solution, the temperature is dropped to 100° C. and some of the solution poured into a mold in the shape of an elongated hollow body which is rotated to coat the interior and then inverted and the excess solution poured back into the original container. The coated mold after being cooled on the outside by running water is filled with water to coagulate the coating. The opaque bag formed of the coagulated resin is withdrawn, filled with water, and subjected to the following test:

The water-filled bag is suspended from a support by a clip or other suitable fastening device and the shrinkage or stretching of the bag filled with water noted. In the present case, a certain amount of shrinkage takes place, the final bag having a length about 15 per cent less than the original as removed from the mold.

*Example B.*—To the above-described mixture of polyvinyl chloride, tricresyl phosphate and acetonyl acetone, 16 parts by weight of ethyl silicate are added. A gelatinous precipitate is formed which redissolves on heating. With the temperature held at 100° C., a bag may be made from this composition following the procedure outlined under Example A. The resulting bag will be found to stretch when filled with water to twice the length of the original. When removed from the mold immediately after coagulation, the film is absolutely colorless and transparent.

From a comparison of the above examples, it is apparent that the addition of a substantial amount of ethyl silicate to the polyvinyl chloride solution markedly increases its wet-strength and extensibility and also decreases or entirely prevents the opacity ordinarily present immediately after coagulation. Although the examples and tests cover bags formed from the improved composition, the same desirable characteristics are present in filaments or sheets prepared from the polyvinyl chloride-organic silicate compositions by processes well known in the art.

The ratio of polyvinyl chloride to the tricresyl phosphate or other plasticizer is not critical in so far as the relative results are concerned. It is desirable, however, that the plasticizer be present in sufficient amounts to impart the desired flexibility to the final product. Other plasticizers, such as dibutyl phthalate, acetylated castor oil, and the like, may be substituted for the tricresyl phosphate and other water-miscible solvents for the acetonyl acetone.

In the above example, 16 parts by weight of tetraethyl silicate were added to eight parts by weight of polyvinyl chloride to obtain a transparent, extensible filament or sheet. As little as six parts by weight of the tetraethyl silicate will prevent opacity upon coagulation. However, with smaller amounts of the silicate, the extensibility of the final product may be somewhat lower. In addition to increasing the wet-strength of the extruded polyvinyl chloride filaments or sheets, the organic silicates also act as heat stabilizing additions whereby the polyvinyl chloride solutions are rendered more stable at higher temperatures.

It has also been found desirable to incorporate small amounts of organic borates into the polyvinyl chloride solutions, such as those described above, for the purpose of further providing against any "tackiness" in the final coagulated filaments or sheets. Examples of such borates are the normal butyl borate, normal amyl borate and octyl borate. Upon coagulation of a suitable polyvinyl chloride solution containing an organic borate, the borate apparently tends to decompose or hydrolyze under the action of the water forming a thin film of boric acid on the surface of the sheet which effectively prevents sticking of the sheets or threads to one another when wound on a spool or roll.

Ordinarily the normal butyl borate is preferred since it is more soluble in the solvent, such as acetonyl acetone, used in preparing the polyvinyl halide solution. The organic borate should not be used in quantities substantially exceeding 12 per cent by weight based on the polyvinyl chloride, as larger quantities of the borate tend to impart an opalescent appearance to the final product.

One formula particularly suitable for the formation of filaments containing the borate is as follows:

Example C

| | Grams |
|---|---|
| Polyvinyl chloride | 7 |
| Tricresyl phosphate | 3 |
| Tetraethyl silicate | 7 |
| Normal butyl borate | 2 |
| Acetonyl acetone | 81 |
| | 100 |

Filaments prepared from this composition may have varying degrees of luster depending upon the time of immersion in the water bath used to coagulate the material as it issues from the extruding die or nozzle. Prolongated contact with the water tends to reduce the luster while shorter contact tends to increase it. Faster coagulation and greater luster may be obtained by the addition of various substances, such as common salt, aluminum acetate or other electrolytes, to the above composition which, due to osmotic action, increase the rate of coagulation.

Filaments have been made previously from the co-polymer of vinyl chloride and vinyl acetate. Fabrics made from these filaments are known as "Vinyarn." These filaments, however, were not made by coagulation but by evaporation of the solvent. In other words, the co-polymer was dissolved in a very volatile solvent, such as acetone, and extruded through a die or spinneret into a hot atmosphere where the solvent volatilized, leaving a filament. High molecular weight polyvinyl chloride is practically insoluble in acetone or other volatile solvents hence the co-polymer had to be a low molecular weight material which consequently yielded a weak thread. Further, on account of the presence of the acetate component, the material made from the co-polymer is not so resistant to water.

The threads made from the high molecular weight material disclosed herein, that is to say from material having long linear molecules, are much stronger. Whereas thick filaments which might be used for twine, cordage, and ships' hawsers, cannot be made by the evaporation method, there is no difficulty in making stout filaments by the present coagulation method without unduly slowing down the machines.

Another advantage of the present invention lies in the fact that the ethyl silicate removes the thermo-plasticity from the plasticized polyvinyl chloride composition, and thus fabrics made from the filaments can be pressed with a hot iron without fusion of the filaments or troublesome sticking of the iron. This is not true if the organic silicate is absent.

As polyvinyl chloride cannot be dyed with any of the usual water-soluble dyes, dyes should be selected which combine with or are miscible with the plasticizer, such as the oil-soluble variety. This is especially true if the plasticizer selected be acetylated castor oil or if it contains a certain amount of the acetylated castor oil.

The hereindescribed non-tacky, transparent compositions besides being used in preparing threads or filaments by the usual spinning methods, may also be used in making sheets designed for wrapping material to take the place of the ordinary transparent sheets or foils now on the market, or for transparent bags having unusual wet-strength and extensibility.

What I claim as new and desire to secure by Letters Patent of the United States is:

1. A composition of matter suitable for the preparation of filaments, sheets, or the like by coagulation with water, comprising a solution of polyvinyl chloride, a plasticizer therefor and tetraethyl silicate in a water-miscible organic solvent, the said silicate being present in amounts between 12 and 300 per cent by weight based on the weight of the polyvinyl chloride.

2. A composition of matter capable of being coagulated to a transparent, strong, extensible article comprising 8 parts by weight of polyvinyl chloride, a plasticizer therefor, a water-miscible solvent and from 6 to 16 parts by weight of tetraethyl silicate.

3. A heat-stable polyvinyl chloride solution containing a plasticizer and tetraethyl silicate as a heat-stabilizing material, the said silicate being present in amounts between 12 and 300 per cent by weight based on the weight of the polyvinyl chloride.

4. The method of improving the wet-strength of extruded plasticized polyvinyl chloride which comprises adding a substantial quantity of a hydrolyzable tetraethyl silicate to the plasticized polyvinyl chloride solution prior to extrusion, and extruding the modified polyvinyl chloride.

5. A composition of matter comprising polyvinyl chloride, a plasticizer and a hydrolyzed tetraethyl ester of silicic acid, the said ester of silicic acid being present in amounts between 12 and 300 per cent by weight based on the weight of the polyvinyl chloride.

6. A formed product comprising polyvinyl chloride, a plasticizer and hydrolyzed tetraethyl silicate, the said ethyl silicate being present in amounts between 12 and 300 per cent by weight based on the weight of the polyvinyl chloride.

7. A filament of high wet-strength and low thermo plasticity comprising a mixture of polyvinyl chloride, a plasticizer and hydrolyzed tetraethyl silicate, the said tetraethyl silicate being present in amounts between 12 and 300 per cent by weight based on the weight of the polyvinyl chloride.

8. A composition of matter consisting substantially of an acetonyl-acetone solution of polyvinyl chloride, a plasticizer for the polyvinyl chloride, from 12 to 300 per cent by weight of tetraethyl silicate based on the weight of the polyvinyl chloride, and less than 12 per cent by weight of normal butyl borate based on the weight of the polyvinyl chloride, the said composition being capable of forming transparent, strong, extensible, non-tacky products upon coagulation with water.

JAMES G. E. WRIGHT.